(12) United States Patent
Hirase et al.

(10) Patent No.: US 11,629,781 B2
(45) Date of Patent: Apr. 18, 2023

(54) WORK VEHICLE

(71) Applicant: KUBOTA CORPORATION, Osaka (JP)

(72) Inventors: Yuji Hirase, Osaka (JP); Ryoma Iwase, Osaka (JP); Tsuyoshi Gono, Osaka (JP); Takuya Nishikubo, Osaka (JP); Susumu Takeoka, Osaka (JP); Tsubasa Kawazoe, Osaka (JP); Atsushi Jinnai, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/050,724

(22) PCT Filed: Dec. 6, 2019

(86) PCT No.: PCT/JP2019/047757
§ 371 (c)(1),
(2) Date: Oct. 26, 2020

(87) PCT Pub. No.: WO2020/137439
PCT Pub. Date: Jul. 2, 2020

(65) Prior Publication Data
US 2021/0364074 A1    Nov. 25, 2021

(30) Foreign Application Priority Data

Dec. 27, 2018  (JP) .................................. 2018-245770
Aug. 30, 2019  (JP) .............................. JP2019-158483

(51) Int. Cl.
*F16H 47/04*    (2006.01)
*B60K 17/06*    (2006.01)
(Continued)

(52) U.S. Cl.
CPC ............. *F16H 47/04* (2013.01); *B60K 17/06* (2013.01); *B60K 17/10* (2013.01); *B60K 17/28* (2013.01); *F16H 2047/045* (2013.01)

(58) Field of Classification Search
CPC ... F16H 47/04; F16H 2047/045; B60K 17/06; B60K 17/10; B60K 17/28
See application file for complete search history.

(56) References Cited

U.S. PATENT DOCUMENTS 2,962,915 A     12/1960   Wiggermann
3,433,095 A  *  3/1969    Tuck .................... F16H 47/04
                                                      475/81
(Continued)

FOREIGN PATENT DOCUMENTS

AU    WO-8705574 A1  *  7/1978  ............ B62D 11/12
GB       917 679 A        2/1963
(Continued)

OTHER PUBLICATIONS

Office Action issued in corresponding Indian Patent Application No. 202147012421 dated Oct. 8, 2021, along with English translation thereof.
(Continued)

*Primary Examiner* — Tinh Dang
(74) *Attorney, Agent, or Firm* — Greenblum & Bernstein, P.L.C.

(57) ABSTRACT

A work vehicle includes a hydrostatic stepless speed changer device configured to speed-change driving power of an engine steplessly, a plurality of planetary gear speed changer devices configured to speed-change the driving power speed-changed by the stepless speed changer device, a plurality of clutch mechanisms corresponding to the plurality of planetary gear speed changer devices in order to take off the driving powers from these plurality of planetary gear speed changer devices individually, and a traveling speed (Continued)

changer device for speed-changing and transmitting the driving powers transmitted from the plurality of clutch mechanisms to a traveling mechanism. The plurality of planetary gear speed changer devices the plurality of clutch mechanisms and the traveling speed changer device are accommodated in a transmission case.

15 Claims, 7 Drawing Sheets

(51) Int. Cl.
 B60K 17/10 (2006.01)
 B60K 17/28 (2006.01)
 F16H 37/08 (2006.01)

(56) References Cited

U.S. PATENT DOCUMENTS

| | | | | |
|---|---|---|---|---|
| 3,597,997 | A * | 8/1971 | Phillips | F16H 47/04 475/81 |
| 3,675,507 | A * | 7/1972 | Takekawa | F16H 47/04 475/81 |
| 3,969,958 | A * | 7/1976 | Miyao | F16H 47/04 475/82 |
| 4,134,311 | A * | 1/1979 | Orshansky, Jr. | F16H 47/04 475/81 |
| 4,168,637 | A * | 9/1979 | Orshansky, Jr. | F16H 47/04 475/81 |
| 4,286,477 | A * | 9/1981 | Meyerle | F16H 47/04 475/82 |
| 4,895,050 | A * | 1/1990 | Meyerle | F16H 47/04 62/48.2 |
| 5,114,385 | A * | 5/1992 | Meyerle | F16H 47/04 475/79 |
| 5,328,418 | A * | 7/1994 | Meyerle | F16H 47/04 475/81 |
| 6,440,026 | B1 * | 8/2002 | Johnson | F16H 47/04 475/81 |
| 7,410,446 | B2 * | 8/2008 | DeMarco | F16H 61/4165 477/98 |
| 8,308,597 | B2 * | 11/2012 | Hiraoka | F16H 47/04 475/80 |
| 9,945,464 | B2 * | 4/2018 | Hirase | F16H 47/04 |
| 10,647,193 | B2 * | 5/2020 | McKinzie | F16H 3/728 |
| 2002/0183155 | A1 | 12/2002 | Pollman | |
| 2006/0172855 | A1 | 8/2006 | Pollak et al. | |
| 2009/0156345 | A1 | 6/2009 | Ishimori et al. | |
| 2012/0046138 | A1 * | 2/2012 | Hana | F16H 47/04 475/72 |
| 2016/0238118 | A1 | 8/2016 | Kato et al. | |
| 2016/0312872 | A1 * | 10/2016 | Hirase | B62D 49/06 |
| 2018/0043764 | A1 * | 2/2018 | McKinzie | B60K 6/48 |

FOREIGN PATENT DOCUMENTS

| | | |
|---|---|---|
| JP | 5-164238 A | 6/1993 |
| JP | 2003-049926 A | 2/2003 |
| JP | 3927398 B2 | 6/2007 |
| JP | 2008-215499 A | 9/2008 |
| JP | 2010-159883 A | 7/2010 |
| JP | 2014-132196 A | 7/2014 |
| JP | 2015-67092 A | 4/2015 |
| JP | 2017-82980 A | 5/2017 |

OTHER PUBLICATIONS

International Search Report issued in International Patent Application No. PCT/JP2019/047757, dated Feb. 18, 2020 and along with English Translation thereof.
Japanese Office Action in counterpart Application No. JP 2020-195802, dated Jan. 4, 2023.
European Search Report in counterpart Application No. EP19904027.0, dated Jan. 25, 2023.
Partial Supplementary European Search Report in counterpart Application No. EP19904027.0, dated Oct. 26, 2022.

* cited by examiner

WORK VEHICLE

TECHNICAL FIELD

The present invention relates to a work vehicle configured such that driving power of engine is speed-changed by a hydrostatic stepless speed changer device and a planetary gear speed changer device.

The present invention relates also to a work vehicle configured such that change of a traveling speed is possible by a transmission engaging/disengaging operation of a multiple plate type clutch.

RELATED ART

Related Art 1

As a work vehicle having the above-described configuration, Patent Document 1 discloses a technique in which driving power of an engine is speed-changed firstly by a hydrostatic stepless speed changer device and speed-changed subsequently by a planetary gear speed changer device and then further speed-changed by an auxiliary speed changer device.

The planetary gear speed changer device described in this Patent Document 1 includes three planetary gear speed changing sections (referred to as "planetary transmission mechanisms" in the document) which are disposed in series along a common axis and includes also two clutch mechanisms which are configured to take off driving power from two of the three planetary gear speed changing sections individually. In particular, in this planetary gear speed changer device, the two clutch mechanisms too are disposed in series along the same axis as the three planetary gear speed changing sections.

Further, the auxiliary speed changer device described in Patent Document 1 is comprised of combination of two clutch mechanisms and two sets of gears so as to be able to change the driving power transmitted from the planetary gear speed changer device in two high and low speed stages.

Related Art 2

As a work vehicle having the above-described configuration, according to the disclosure of Patent Document 2, there is provided a hydraulic speed changer device having a high-speed side first hydraulic clutch and a low-speed side second hydraulic clutch in order to speed-change driving power from a traveling propelling shaft in two high and low stages and a corotation preventing arrangement having a brake member which comes into contact with a transmitting body of the hydraulic speed changer device when both the first hydraulic clutch and the second hydraulic clutch are under transmission disengaging states.

In this Patent Document 2, a second gear to which the driving power from the second hydraulic clutch is transmitted is used as the transmitting body, a piston is accommodated in an oil chamber formed inside a transmission case and the brake member is provided at the leading end of this piston.

In this Patent Document 2, there is also provided a switching valve for feeding work oil selectively to one of the first hydraulic clutch and the second hydraulic clutch. In operation, when the switching valve is under a state of not feeding the work oil to either the first hydraulic clutch or the second hydraulic clutch, the work oil is fed to the piston to cause the bake member to protrude, thereby applying a braking force to the transmitting body.

RELATED ART DOCUMENTS

Patent Documents

Patent Document 1: Japanese Unexamined Patent Application Publication No. 2010-159883
Patent Document 2: Japanese Unexamined Patent Application Publication No. 5-164238

SUMMARY OF THE INVENTION

Problems to be Solved by Invention

Problem 1

A problem corresponding to [Related Art 1] is as follows.

With the speed changing arrangement described in Patent Document 1, stepless speed changing operations are possible with the stepless speed changer device and speed changing operations in two stages are possible with the planetary gear speed changer device and further speed changing operations in two additional stages are possible with the auxiliary speed changer device. As a result, this speed changing arrangement realizes speed changing operations in multiple stages.

Further, in the speed changing arrangement described in Patent Document 1, the planetary gear speed changer device allows speed reduction at large speed reduction ratios, so the arrangement allows use of a stepless speed changer device having a small capacity.

However, in the planetary gear speed changer device described in Patent Document 1, since three planetary gear speed changing sections are arranged in series and also two clutch mechanisms are arranged in series, the arrangement is not only complicated, but also invites enlargement thereof in the front/rear direction. Especially, since the speed changing arrangement described in Patent Document 1 invites complexity also in the transmission arrangement for taking off speed-changed driving power, so there remains room for improvement.

For the reasons mentioned above, there is a need for a work vehicle that allows suppression of disadvantageous enlargement of the speed changing arrangement and also allows simplification of this speed changing arrangement, without compromising the advantage of using a hydrostatic stepless speed changer device and a planetary gear speed changer device.

Problem 2

A problem corresponding to [Related Art 2] is as follows.

The corotation preventing arrangement described in Patent Document 2 suppresses occurrence of a phenomenon that when the first hydraulic clutch and the second hydraulic clutch are under the transmission disengaging states, in association with rotation of the propelling shaft, a part of the hydraulic speed changer device will rotate with this propelling shaft, so that the driving power of the propelling shaft is transmitted to wheels, resulting in movement of the wheel at an extremely low speed.

However, the arrangement of Patent Document 2, for prevention of such corotation, the arrangement would require an oil chamber in the transmission case and require also a piston and a brake member. The arrangement further requires a switching valve and an oil passage which feed work oil to the oil chamber when the two hydraulic clutches of the hydraulic speed changer device are under the transmission disengaging states. Thus, the arrangement is complicated, inviting increase in the number of components, leading to cost increase.

For the reasons mentioned above, there is a need for a work vehicle which can suppress the inconvenience of the vehicle body being moved at a low speed when the hydraulic cutch is under the transmission disengaging state, without inviting disadvantageous complication in the arrangement for suppressing corotation.

Solutions

Solution corresponding to [Problem 1] is as follows.

According to a characterizing feature of a work vehicle relating to the present invention, the work vehicle comprises:

a hydrostatic stepless speed changer device configured to speed-change driving power of an engine steplessly;

a plurality of planetary gear speed changer devices configured to speed-change the driving power speed-changed by the stepless speed changer device;

a plurality of clutch mechanisms corresponding to the plurality of planetary gear speed changer devices in order to take off the driving powers from these plurality of planetary gear speed changer devices individually;

a traveling speed changing section for speed-changing and transmitting the driving powers transmitted from the plurality of clutch mechanisms to a traveling mechanism;

the plurality of planetary gear speed changer devices being arranged in juxtaposition relationship with each other; and the plurality of planetary gear speed changer devices, the plurality of clutch mechanisms, and the traveling speed changing section being accommodated in a transmission case.

With this characterizing feature, the driving power of the engine is speed-changed steplessly by the stepless speed changer device and the driving power thus speed-changed can be speed-reduced largely in each one of the plurality of planetary gear speed changer devices. Therefore, as the stepless speed changer device, one having a small capacity can be employed. Further, the driving powers speed-changed by the plurality of planetary gear speed changer devices will be taken off individually by the clutch mechanisms corresponding thereto, and can be transmitted as such to the traveling speed changing section. In particular, since the plurality of planetary gear speed changer devices are arranged in juxtaposition relationship with each other, reduction in the dimension in the front/rear direction of the space accommodating the planetary gear speed changer devices is possible, in comparison with an arrangement of the plurality of planetary gear speed changer devices being arranged in series.

Therefore, there is realized a work vehicle that allows suppression of disadvantageous enlargement of the speed changing arrangement and also allows simplification of this speed changing arrangement, without compromising the advantage of using a hydrostatic stepless speed changer device and a planetary gear speed changer device.

According to a further characterizing feature:

the engine, the stepless speed changer device and the plurality of planetary gear speed changer devices are disposed in this mentioned order along the front/rear direction of the vehicle body;

the stepless speed changer device includes a variable displacement type hydraulic pump driven by the engine and a hydraulic motor rotated by work oil fed from the hydraulic pump;

an input shaft of the hydraulic pump and an output shaft of the hydraulic motor are formed to protrude toward the disposing direction of the planetary gear speed changer devices;

a drive shaft for transmitting the driving power of the engine is disposed to penetrate the stepless speed changer device along the front/rear direction; and there are provided a drive gear mechanism for transmitting a driving power from a portion of the driving shaft which portion penetrates the stepless speed changer device to the input shaft and a branching gear mechanism for transmitting the driving power from the output shaft to the plurality of planetary gear speed changer devices.

With the above-described arrangement, the driving shaft transmitting the driving power of the engine penetrates the stepless speed changer device in the front/rear direction and as the driving power available from the penetrating part thereof is transmitted to the input shafts of the plurality of planetary gear speed changer devices via the drive gear mechanism, speed changing operations in the stepless speed changer device are made possible. Further, as the driving power from the output shaft of the stepless speed changer device is transmitted via the branching gear mechanism to the plurality of planetary gear speed changer devices, speed changing operations in the plurality of planetary gear speed changer devices are made possible.

According to a further characterizing feature:

as the plurality of planetary gear speed changer devices, there are provided a first planetary gear speed changer device of the high speed side having a small speed changing ratio and a second planetary gear speed changer device on the low speed side having a large speed changing ratio;

as the plurality of clutch mechanisms, there are provided a first clutch mechanism for engaging/disengaging transmission of the driving power from the first planetary gear speed changer device and a second clutch mechanism for engaging/disengaging transmission of the driving power from the second planetary gear speed changer device; and the traveling speed changing section includes an auxiliary speed changer device for speed-changing the driving powers from the first clutch mechanism and the second clutch mechanism.

With the above-described arrangement, by selectively operating the first clutch mechanism and the second clutch mechanism, it is possible to take off the driving power speed-changed by the first planetary gear speed changer device and the driving power speed-changed by the second planetary gear speed changer device and to further speed-change these driving powers to be transmitted to the traveling mechanism.

According to a still further characterizing feature:

the stepless speed changer device includes a variable displacement type hydraulic pump driven by the engine, a hydraulic motor rotated by work oil fed from the hydraulic pump, and a port block defining a hydraulic circuit formed between the hydraulic pump and the hydraulic pump; and the hydraulic pump and the hydraulic motor are disposed on the side of a rear face of the port block.

With the above-described arrangement, as the hydraulic pump and the hydraulic motor are disposed on the side of the rear face of the port block, it becomes readily possible to form e.g. an arrangement of causing the input shaft of the hydraulic pump to protrude rearwards and causing the output shaft of the hydraulic motor to protrude rearwards.

Solution corresponding to [Problem 2] is as follows.

According to a characterizing feature of a work vehicle relating to the present invention, the work vehicle comprises:

a first clutch mechanism of a wet type configured to engage/disengage transmission of a traveling driving power transmitted from a first shaft to a traveling mechanism;

a second clutch mechanism of a wet type configured to engage/disengage transmission of a traveling driving power transmitted from a second shaft to the traveling mechanism;

an intermediate rotational member rotatable relative to the first shaft due to a drag torque associated with rotation of the first shaft; and a coupling portion configured to transmit a rotational power of the intermediate rotational member to an output portion of the second clutch mechanism.

With the above-described arrangement, in case the first clutch mechanism is set to its power-transmission disengaging state, a drag torque acting on a friction plate of the first clutch mechanism is transmitted to a traveling driving system. Similarly, in case the second clutch mechanism is set to its power-transmission disengaging state, a drag torque acting on a friction plate of the second clutch mechanism is transmitted to the traveling driving system.

On the other hand, according to the characterizing arrangement, the rotational power of the intermediate rotational member which is rotated by the drag torque associated with rotation of the first transmission shaft is transmitted to the output portion of the second clutch mechanism via the coupling portion. With this, it becomes possible to e.g. increase the speed difference between the rotational speed of the output portion of the second clutch and the rotational speed transmitted from the coupling portion. Further, by setting the rotational directions of the driving powers transmitted from the coupling portion opposite to each other, it becomes also possible to generate a torque which suppresses relative rotations, thus offsetting the driving power to be transmitted to the traveling driving system. That is, through effective utilization of drag torques which are generated in the two clutch mechanisms under their transmission disengaging states, the arrangement, though not having any actuator, still allows for reduction and offset of the rotational power to be transmitted to the traveling transmission system.

Consequently, there has been realized a work vehicle which can suppress the inconvenience of the vehicle body being moved at a low speed when the hydraulic cutch is under the transmission disengaging state, without inviting disadvantageous complication in the arrangement for suppressing corotation.

According to an additional arrangement to the above-described arrangement:

the work vehicle further comprises:

a first planetary gear speed changer device for speed-changing traveling driving power and transmitting the resultant power to the first shaft;

a second planetary gear speed changer device for speed-changing traveling driving power and transmitting the resultant power to the second shaft;

the first clutch mechanism being configured to transmit, under its transmission engaging state, the driving power of the first shaft to the traveling mechanism as a forward traveling driving power;

the second clutch mechanism including a forward traveling clutch section configured to transmit, under its transmission engaging state, the driving power of the second shaft to the traveling mechanism as a forward traveling driving power and a reverse traveling clutch section configured to transmit, under its transmission engaging state, the driving power of the second shaft to the traveling mechanism as a reverse traveling driving power to the traveling mechanism; and the second clutch mechanism further including a reverse traveling output gear configured to output the reverse traveling driving power from the reverse traveling clutch section, so that with meshing of the reverse traveling output gear with a reverse traveling transmission gear, the reverse traveling driving power is transmitted to the traveling mechanism.

With the above-described arrangement, traveling driving power is transmitted from the first planetary gear speed changer device via the first shaft to the first clutch mechanism. The first clutch mechanism, under its transmission engaging state, transmits the driving power of the first shaft to the traveling mechanism as forward traveling driving power. Further, the traveling driving power is transmitted from the second planetary gear speed changer device via the second shaft to the second clutch mechanism. The forward traveling clutch section of the second clutch mechanism transmits, under its transmission engaging state, the diving power of the second shaft to the traveling mechanism as forward traveling driving power. The reverse traveling clutch section of the second clutch mechanism transmits, under its transmission engaging state, the driving power of the second shaft to the traveling mechanism as reverse traveling driving power.

According to an additional arrangement to the above-described arrangement:

the coupling portion comprises a gear portion which is rotated by a rotational power of the intermediate rotational member, the gear portion being meshed with the reverse traveling transmission gear.

With the above-described arrangement, when the first clutch mechanism and the second clutch mechanism are under their transmission disengaging states, in association with rotation of the first shaft, a drag torque will be applied in the forward traveling direction from the first clutch mechanism to the traveling mechanism; and in association with rotation of the second shaft, a drag torque will be applied in the forward traveling direction from the forward traveling clutch section of the second clutch to the traveling mechanism and a drag torque will be applied in the reverse traveling direction from the reverse traveling clutch section of the second clutch to the traveling mechanism.

Here, when a comparison arrangement not having the intermediate rotational member is considered, with this comparison arrangement, drag torques will be applied in the forward traveling direction from the two clutch mechanisms and a drag torque will be applied in the reverse traveling direction from one clutch mechanism. Thus, in comparison with a drag torque applied in the reverse traveling direction, the drag torque in the forward traveling direction is greater, thus inviting inconvenience of the vehicle body traveling forwardly at a low speed. On the other hand, by meshing the gear portion rotated by the rotational power of the rotational member rotated by the drag torque of the first shaft with the reverse traveling transmission gear, thereby to increase the drag torque in the reverse traveling direction applied to the traveling mechanism in the above-described comparison arrangement, it becomes also possible to offset the drag torque in the forward traveling direction and the drag torque in the reverse traveling direction with each other.

According to an additional arrangement to the above-described arrangement:

the gear portion is formed in an outer circumference of the intermediate rotational member.

With the above-described arrangement, as it becomes possible to transmit the rotational power of the intermediate rotational member directly from the gear portion to the reverse traveling transmission gear, it becomes also possible to simplify the transmission arrangement.

According to an additional arrangement to the above-described arrangement:

a driving speed transmitted from the first shaft to the traveling mechanism when the first clutch mechanism is under the transmission engaging state is higher than a driving speed transmitted from the second shaft to the traveling mechanism when the forward traveling clutch section of the second clutch is under the transmission engaging state;

the intermediate rotational member is rotatably supported to the first shaft and includes a friction plate rotatable with the intermediate rotational member; and the friction plate is disposed adjacent a friction member which is rotatable with a clutch housing of the first clutch mechanism.

With the above-described arrangement, by setting the first clutch to the transmission engaging state, traveling at a predetermined speed is made possible. By setting the forward traveling clutch section of the second clutch mechanism to the transmission engaging state, traveling at a speed lower than the above-described predetermined speed is made possible. Further, since a friction plate rotatable together with the intermediate rotational member is disposed adjacent a friction member which is rotatable with a clutch housing of the first clutch mechanism, if the clutch housing of the first clutch mechanism is rotated by a drag torque associated with rotation of the first shaft, it becomes possible to transmit this rotation to the intermediate rotational member.

According to an additional arrangement to the above-described arrangement:

the work vehicle further comprises:

an auxiliary speed changer device configured to speed-change the driving powers from the first clutch mechanism and the second clutch mechanism.

With this arrangement, it becomes possible for the auxiliary speed changer device to speed-change the traveling driving power from the first clutch mechanism and the traveling driving power from the second clutch mechanism and then to transmit the resultant powers to the traveling mechanism.

According to an additional arrangement to the above-described arrangement:

the work vehicle further comprises:

a hydrostatic stepless speed changer device configured to steplessly speed-change the driving power of the engine and to transmit the resultant power to the first planetary gear speed changer device and the second planetary gear speed changer device as the traveling driving power; and the first planetary transmission gear speed changer device and the second planetary gear speed changer device are accommodated in a transmission case in a juxtaposition relationship with each other.

With the above-described arrangement, it becomes possible for the hydrostatic stepless speed changer device to steplessly speed-change the driving power of the engine and to transmit the resultant power to the first planetary gear speed changer device and the second planetary gear speed changer device. And, as the first planetary gear speed changer device and the second planetary gear speed changer device are accommodated in a transmission case in a juxtaposition relationship with each other, the front/rear length of the transmission case can be reduced.

According to an additional arrangement to the above-described arrangement:

the engine and the stepless speed changer device are disposed in this mentioned order in the front/rear direction;

the first planetary gear speed changer device and the second planetary gear speed changer device are disposed in the juxtaposition relationship, rearwardly of the stepless speed changer device;

the stepless speed changer device includes a variable displacement type hydraulic pump driven by the driving power of the engine and a hydraulic motor rotated by work oil fed from the hydraulic pump;

an input shaft of the hydraulic pump and an output shaft of the hydraulic motor formed to protrude rearwards from the stepless speed changer device;

a drive shaft for transmitting the driving power of the engine is disposed to penetrate the stepless speed changer device in the front/rear direction; and there are provided a driving gear mechanism for transmitting a driving power of a portion of the drive shaft which portion penetrates the stepless speed changer device to the input shaft and a branching gear mechanism for transmitting the driving power of the output shaft to the first planetary gear speed changer device and the second planetary gear speed changer device.

With the above-described arrangement, by setting an oil amount of the work oil fed to the hydraulic motor from the variable displacement type hydraulic pump driven by the driving power of the engine, a driving speed of the hydraulic motor can be adjusted. Further, since the input shaft of the hydraulic pump and the output shaft of the hydraulic pump protrude rearwards from the stepless speed changer device, it becomes possible to transmit the driving power of the penetrating portion of the drive shaft penetrating the stepless speed changer device from the driving gear mechanism to the input shaft and from the branching gear mechanism to the first planetary speed changer device and the second planetary speed changer device.

According to an additional arrangement to the above-described arrangement:

the stepless speed changer device includes a variable displacement type hydraulic pump driven by the engine, a hydraulic motor rotated by work oil fed from the hydraulic pump and a port block defining a hydraulic circuit formed between the hydraulic pump and the hydraulic motor; and the hydraulic pump and the hydraulic motor are disposed on the side of a rear face of the port block.

With the above-described arrangement, as the hydraulic pump and the hydraulic motor are disposed on the side of the rear face of the port block, it becomes readily possible to form e.g. an arrangement of causing the input shaft of the hydraulic pump to protrude rearwards and causing the output shaft of the hydraulic motor to protrude rearwards.

EMBODIMENT

Next, an embodiment of the present invention will be explained with reference to the accompanying drawings.
[General Configuration]

Figure 1:
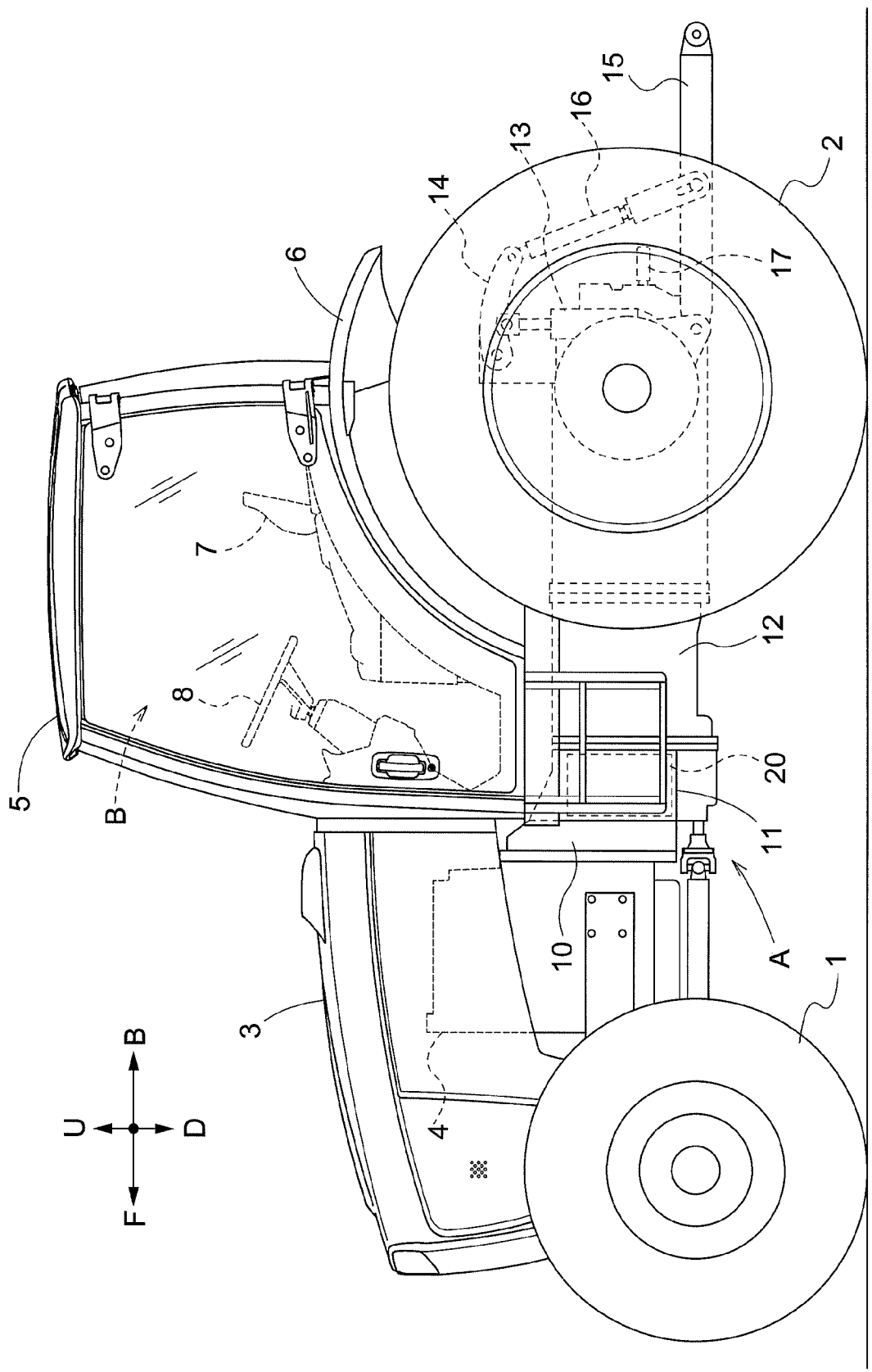
FIG. 1 is a side view of a tractor.

As shown in FIG. 1, a traveling vehicle body A includes a pair of left and right front wheels 1 and a pair of left and right rear wheels 2. An engine 4 is provided inside an engine hood 3 disposed at a front portion of the traveling vehicle body A. At a rear portion of the traveling vehicle body A, there is disposed a driving section B having a cabin 5. With these, there is constituted a tractor as a "work vehicle". In this tractor, the left and right front wheels 1 and the left and right rear wheels 2 function as "traveling mechanism(s)".

Figure 2:
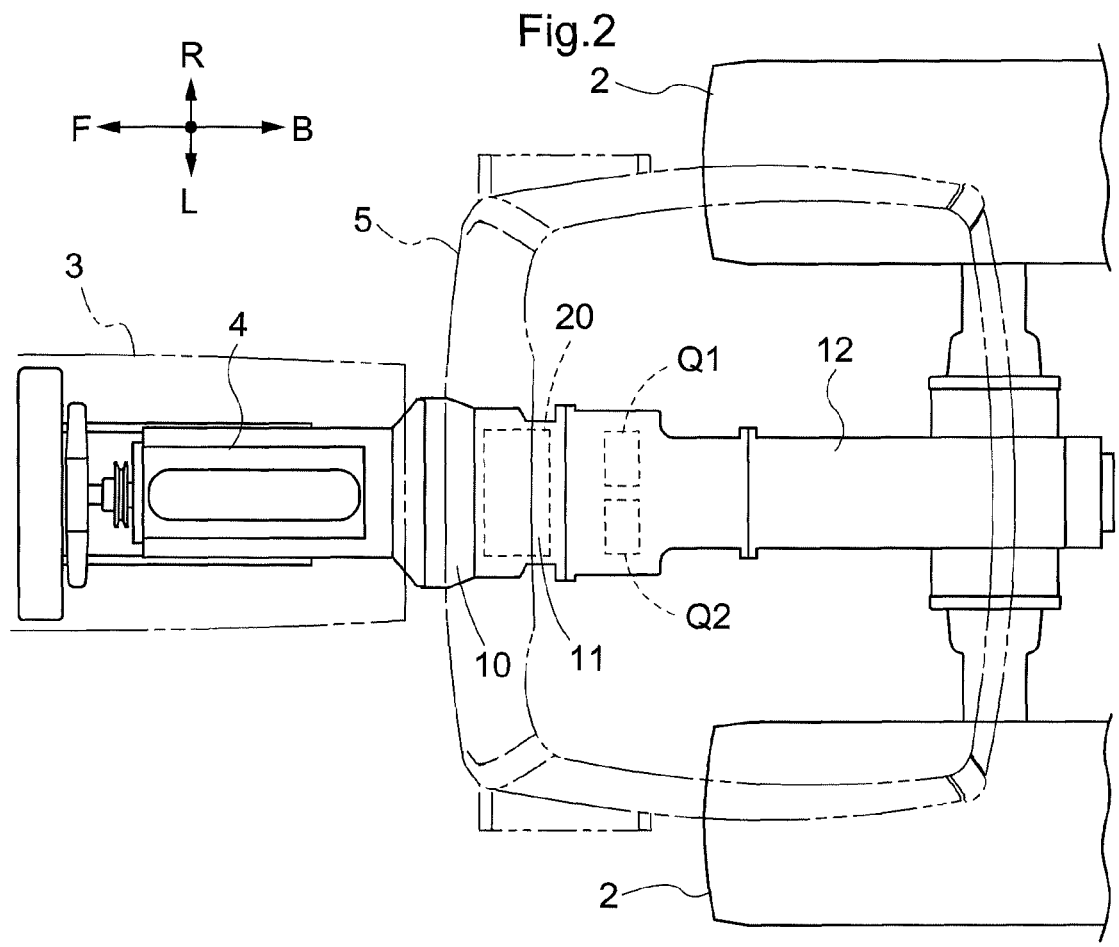
FIG. 2 is a plan view showing layout of a clutch housing and a stepless speed changer housing.

As shown in FIG. 1 and FIG. 2, a sign F in the drawings denotes the "forward direction" and a sign B denotes the rear direction, a sign U denotes "upper direction", a sign D denotes the "lower direction", a sign R denotes "right direction" and a sign L denotes "left direction", respectively.

Inside the cabin 5, there are provided a driver's seat 7 disposed at a mid position between left and right rear wheel fenders 6 and a steering wheel 8 disposed forwardly thereof. Further, adjacent the driver's seat 7, there are provided operational levers, switches, etc.

As shown in FIGS. 1 through 4, in this tractor, on the rear side of the engine 4, a main clutch housing 10, a stepless speed changer housing 11 and a transmission case 12 are connected in this mentioned order. The transmission case 12 accommodates a traveling speed changer device 50 (an example of a "traveling speed changing section") for transmitting driving power to the left and right front wheels 1 and rear wheels 2.

At rear portions of the transmission case 12, there are provided a pair of left and right lift arms 14 which are pivotally lifted up/down by driving power of a hydraulic cylinder 13 and a pair of left and right lower links 15, pivotal ends of the lift arms 14 and the lower links 15 being connected under a suspended state via lift rods 16. In a rear face of the transmission case 12, there is provided a PTO shaft 17 that allows takeoff of driving power to the outside.

With this tractor, a utility implement such as a rotary cultivator, a plow, etc. will be connected to rear ends of the left and right lower links 15, so that the implement can be lifted up/down by elevating/lowering operations of the left and right lift arms 14. Further, in case a rotary cultivator is used as an (utility) implement, a drive shaft will be provided between the PTO shaft 17 and the rotary cultivator for transmitting driving power thereto.
[Speed Changing Arrangement]

In this tractor, as shown in FIGS. 1-4, the main clutch housing 10 accommodates therein a main clutch mechanism 18 and the stepless speed changer housing 11 accommodates therein a hydrostatic stepless speed changer device 20. Further, the transmission case 12 accommodates therein a first planetary gear speed changer device Q1 on the high speed side having a small speed changing ratio, a second planetary gear speed changer mechanism Q2 on the low speed side having a large speed changing ratio, a first clutch mechanism C1 and a second clutch mechanism C2, a traveling speed changer device 50, and an implement speed changer device 70.

Figure 4:
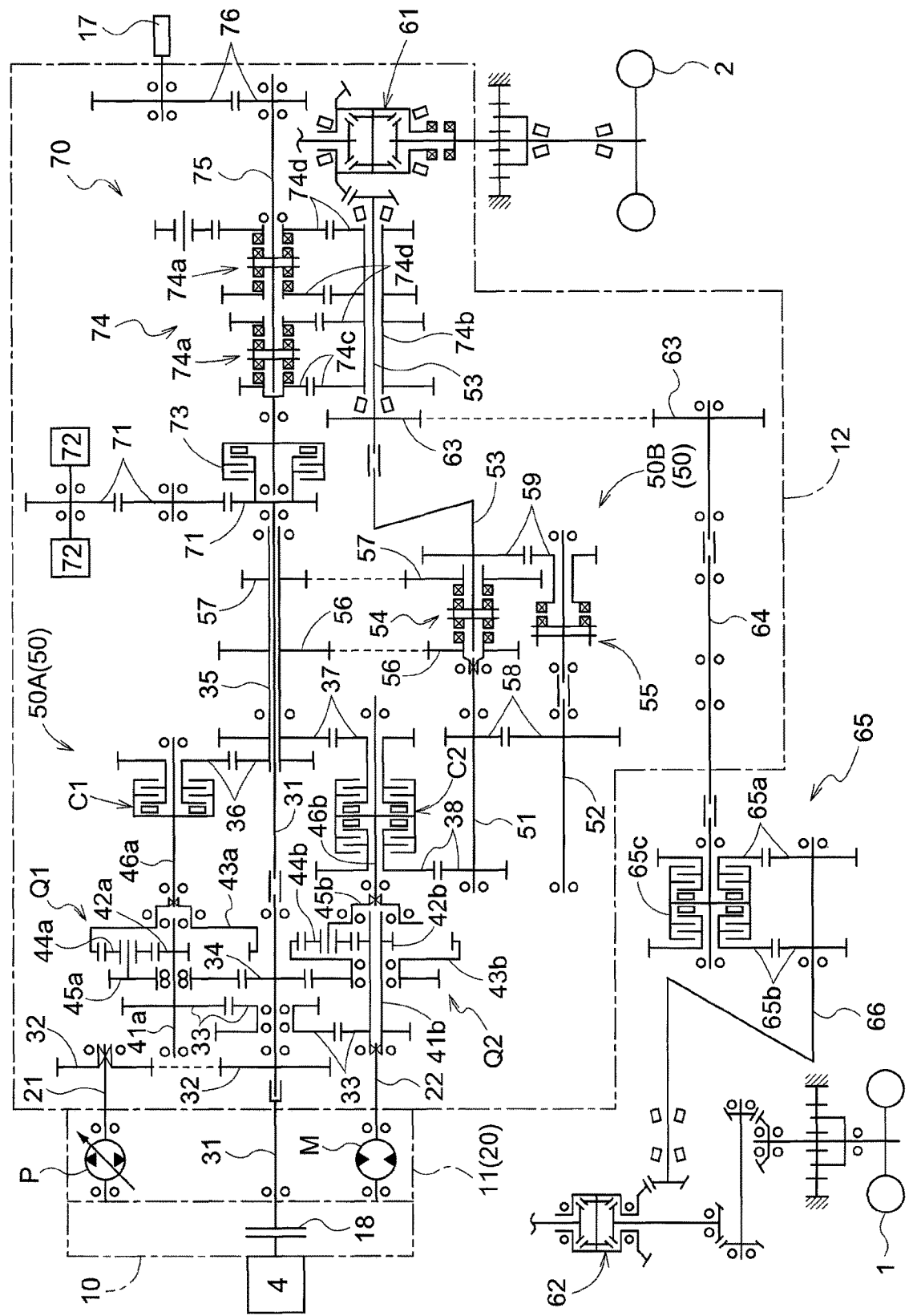
FIG. 4 is a view schematically showing a transmission arrangement.

As shown in FIG. 4, with this speed changing arrangement, the stepless speed changer device 20, the first planetary gear speed changer device Q1, the second planetary gear speed changer device Q2, the first clutch mechanism C1, the second clutch mechanism C2 and transmission gears operably coupled therewith together constitute a main speed changer device 50A. Further, a first speed changing section 54, a second speed changing section 55 and transmission gears operably coupled therewith together constitute an auxiliary speed changer device 50B.

Moreover, there are provided a traveling transmission arrangement for transmitting the driving power from the traveling speed changer device 50 via a rear wheel drive shaft 53 to a rear wheel differential gear 61 and further to the rear wheels 2 and a traveling transmission arrangement for transmitting the driving power from the rear wheel drive shaft 53 to a front wheel differential gear 62 and further to the front wheels 1.

Also, the traveling transmission arrangement for transmitting the driving power to the front wheels 1 is configured such that the driving power is transmitted from the rear wheel drive shaft 53 via the front wheel transmission gear 63 to a front wheel transmission shaft 64 and then via this front wheel transmission shaft 64 to the front wheel drive shaft 66 via a front wheel speed changer device 65 and further to a front wheel differential gear 62.

In particular, in this arrangement, the first planetary gear speed changer device Q1 and the second planetary gear speed changer device Q2 are specific examples of "a plurality of planetary gear speed reduction devices"; and the first clutch mechanism C1 and the second clutch mechanism C2 are specific examples of clutch mechanisms for engaging/disengaging transmission of the driving power from the planetary gear speed reduction mechanisms.

The main clutch mechanism 18 is configured to be settable to a state of transmitting driving power of the engine 4 and a state of not transmitting the power, in response to a worker's operation. The stepless speed changer device 20, in response to a speed changing operation by a worker, speed-change a traveling speed steplessly and enables also stopping of the traveling vehicle body A by creating a state of not outputting any driving power.
[Main Speed Changer Device: Stepless Speed Changer Device]

Figure 3:
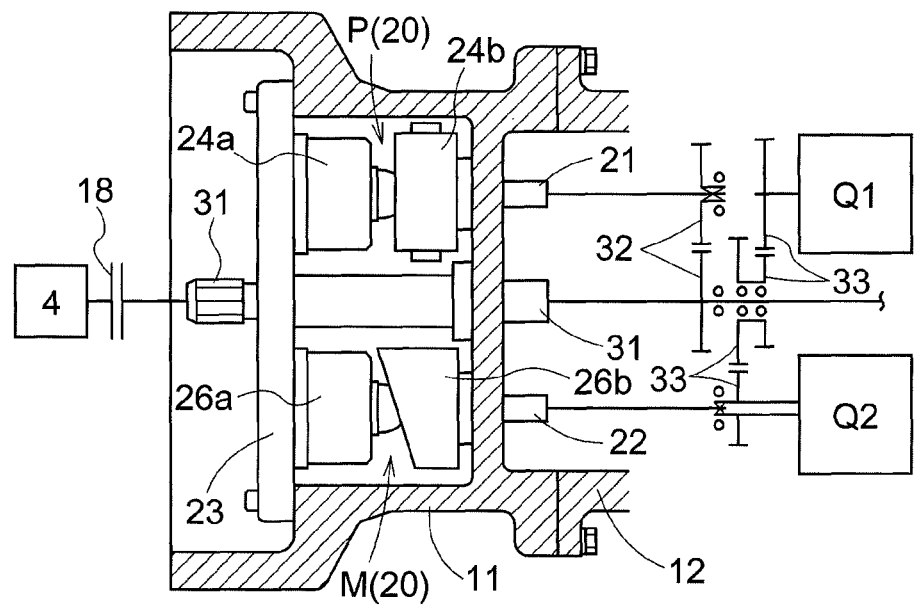
FIG. 3 is a section view of the stepless speed changer housing.

As shown in FIG. 3 and FIG. 4, the stepless speed changer device 20 has a configuration that a variable displacement type hydraulic pump P to which the driving power of the engine 4 is transmitted via an input shaft 21, a hydraulic motor M configured to transmit a speed-changed driving power to the first planetary gear speed changer device Q1 and the second planetary gear speed changer device Q2 via an output shaft 22, and a port block 23 defining a pair of oil passages for feeding/discharging work oil between the hydraulic pump P and the hydraulic motor M are all accommodated within a stepless speed changer housing 11. Further, the input shaft 21 and the output shaft 22 are provided under a parallel posture, with protruding ends thereof being oriented rearwards.

In the hydraulic pump P, a pump body 24*a* rotatable with the input shaft 21 is provided with a plurality of plungers which can be expanded and contracted. And, this hydraulic pump P includes a movable swash plate 24*b* which is operable to set expansion/contraction amounts of the plungers at the time of driven rotation of the pump body 24*a*. And, a servo piston (not shown) for controlling the posture of this movable swash plate 24*b* is supported to the stepless speed changer housing 11.

In the hydraulic motor M, a motor body 26*a* rotatable with the output shaft 22 is provided with a plurality of plungers which can be expanded and contracted. And, there is provided a fixed swash plate 26*b* which converts an expanding/contracting movement of the plunger into a rotary motion.

With the above-described configuration, under a state of the movable swash plate 24*b* being set to a predetermined angle (angle relative to the pump axis), if the pump body 24*a* is rotatably driven, in association with this rotation, end portions of the plurality of plungers of the hydraulic pump P will come into contact with the movable swash plate 24*b* and contracted one after another thereby. In the course of this, the work oil is fed to one of the pair of oil passages of the port block 23 and under the pressure of this work oil, the plurality of plungers of the hydraulic motor M will be expanded one after another, and in the course of these expansions, the motor body 26*a* is rotated by a reaction force from the fixed swash plate 26*b*. Incidentally, in association with the rotation of the hydraulic motor M, the plunger of the hydraulic motor M is contracted, and in association with this contraction, the work oil is returned via the other flow passage to the hydraulic pump P.

With this stepless speed changer device 20, by adjusting an angle of the movable swash plate 24*b* through an operation of the servo piston, a discharge amount of the work oil is controlled, whereby the rotational speed of the hydraulic motor M can be set as desired. Further, by setting the angle of the movable swash plate 24*b* orthogonal relative to the input axis, feeding and discharging of the work oil between the hydraulic pump P and the hydraulic motor M are stopped, whereby the hydraulic motor M can be stopped also.

As shown in FIGS. 3 and 4, a main drive shaft 31 to which the driving power of the engine 4 is transmitted via the main clutch mechanism 18 is disposed to penetrate the stepless speed changer device 20 in the front/rear direction; and there is provided a driving gear mechanism 32 for transmitting driving power from this main drive shaft 31 to the input shaft 21 of the stepless speed changer device 20.

Further, a branching gear mechanism 33 is provided for transmitting driving power from the output shaft 22 of the stepless speed changer device 20 to the first planetary gear speed changer device Q1 and the second planetary gear speed changer device Q2 in distribution.

[Main Speed Changer Device: Planetary Gear Speed Changer Devices]

As shown in FIG. 4, the first planetary gear speed changer device Q1 and the second planetary gear speed changer device Q2 are accommodated and disposed in a juxtaposition positional relationship along the left/right direction inside the transmission case 12. In order to engage or disengage transmission of the driving power from a first output shaft 46*a* of the first planetary gear speed changer device Q1, the first clutch mechanism C1 is disposed on the same axis as that of the first output shaft 46*a*. Similarly, in order to engage or disengage transmission of the driving power from a second output shaft 46*b* of the second planetary gear speed changer device Q2, the second clutch mechanism C2 is disposed on the same axis as that of the second output shaft 46*b*.

More particularly, in the first planetary gear speed changer device Q1, a first input shaft 41*a* includes a first sun gear 42*a*. Between a first ring gear 43*a* disposed to be rotatable coaxially with the first input shaft 41*a* and the first sun gear 42*a*, there are provided a plurality of first planetary gears 44*a*. And, a gear portion formed in a first carrier 45*a* which supports the plurality of first planetary gears 44*a* is meshed with a coupling gear portion 34 provided in the main drive shaft 31.

Also, this first planetary gear speed changer device Q1 includes a first output shaft 46*a* which is rotatable in unison with the first ring gear 43*a*.

In the second planetary gear speed changer device Q2, a second input shaft 41*b* includes a second sun gear 42*b*. Between a second ring gear 43*b* disposed to be rotatable coaxially with the second input shaft 41*b* and the second sun gear 42*b*, there are provided a plurality of second planetary gears 44*b*. And, a gear portion formed in a second carrier 45*b* which supports the plurality of second planetary gears 44*b* is meshed with the coupling gear portion 34 provided in the main drive shaft 31.

This second planetary gear speed changer device Q2 includes a second output shaft 46*b* which is rotatable in unison with the second carrier 45*b*.

[Main Speed Changer Device: Clutch Mechanisms]

As shown in FIG. 4, the first clutch mechanism C1 is configured as a wet multiple plate type which can be selectively switched to a power-transmission engaging state of transmitting driving power and a power transmission disengaging state of not transmitting the driving power, with feeding/discharging of the work oil. The second clutch mechanism C2 is comprised of two wet multiple plate type clutch sections each of which can be selectively switched to a power transmission engaging state of engaging driving power transmission and a power transmission disengaging state of disengaging driving power transmission, with feeding/discharging of the work oil.

There is provided a tubular intermediate shaft 35 coaxial and rotatable relative to the main drive shaft 31. When the first clutch mechanism C1 is set to the transmission engaging state, high-speed driving power from the first output shaft 46*a* of the first planetary gear speed changer device Q1 can be transmitted to the intermediate shaft 35 via a first transmission gear 36.

One of the two clutch sections (the right side in FIG. 4) of the second clutch mechanism C2 is designed as forward traveling transmission, so that by setting this clutch section to the power-transmission engaging state, low-speed driving power from the second output shaft 46*b* of the second planetary gear speed changer device Q2 can be transmitted to the intermediate shaft 35 via a second transmission gear 37.

The other of the two clutch sections (the left side in FIG. 4) of the second clutch mechanism C2 is designed as reverse traveling transmission, so that by setting this clutch section to the power-transmission engaging state, low-speed driving power from the second output shaft 46*b* of the second planetary gear speed changer device Q2 can be transmitted to a first counter shaft 51 via a third transmission gear 38.

The first counter shaft 51 is provided under posture parallel with the intermediate shaft 35, and a second counter shaft 52 is provided under a posture parallel with these and a rear wheel drive shaft 53 is provided on the same axis as the first counter shaft 51.

[Auxiliary Speed Changer Device]

The auxiliary speed changer device 50B is constituted of a first speed changing section 54 provided between the first counter shaft 51 and the rear wheel drive shaft 53, a second speed changing section 55 provided on the same axis as the second counter shaft 52, and a transmission gear operably coupled therewith. This auxiliary speed changer device 50b realizes speed changes in three stages of: high speed, intermediate speed and low speed and realizes also a reverse traveling transmission state.

The first speed changing section 54 and the second speed changing section 55 respectively is configured as a manually operable meshing type clutch.

This auxiliary speed changer device 50B includes, between the intermediate shaft 35 and the first speed changing section 54, a high speed transmission gear 56 and an intermediate speed transmission gear 57, includes, between the first counter shaft 51 and the second counter shaft 52, a first low speed transmission gear 58, and further includes, between the second speed changing section 55 and the rear wheel drive shaft 53, a second low speed transmission gear 59.

[Power Transmission Modes]

With the above-described configuration of the traveling speed changer device 50, the driving power of the engine 4 is speed-changed steplessly in the stepless speed changer device 20. When the first clutch mechanism C1 is set to the power-transmission engaging state, high-speed driving power speed-changed by the first planetary gear speed changer device Q1 is transmitted via the first transmission gear 36 to the intermediate shaft 35. Further, when one clutch section of the second clutch mechanism C2 is set to the power-transmission engaging state, low-speed driving power is transmitted via the second transmission gear 37 to the intermediate shaft 35. Further, when the other clutch section of the second clutch mechanism Q2 is set to the power-transmission engaging state, driving power for reverse traveling is transmitted to the first counter shaft 51.

In this main speed changer device 50A, a control mode is set such that the first clutch mechanism C1 and the second clutch mechanism C2 will not be set to the power-transmission engaging states simultaneously. Similarly, an operation mode is set so that the first speed changing section 54 and the second speed changing section 55 will not be set to the power-transmission engaging states simultaneously.

In the auxiliary speed changer device 50B, under the state of the driving power of either one of the first clutch mechanism C1 and the second clutch mechanism C2 being transmitted to the intermediate shaft 35, the first speed changing section 54 transmits the driving power from the high speed transmission gear 56 to the rear wheel drive shaft 53, whereby high speed rotational driving powers will be transmitted to the rear wheels 2 and to the front wheels 1.

Similarly to the above, under the state of the driving power of either one of the first clutch mechanism C1 and the second clutch mechanism C2 being transmitted to the intermediate shaft 35, when the first speed changing section 54 transmits the driving power from the intermediate speed transmission gear 57 to the rear wheel drive shaft 53, whereby intermediate speed rotational driving powers will be transmitted to the rear wheels 2 and to the front wheels 1.

Moreover, under the state of the driving power of either one of the first clutch mechanism C1 and the second clutch mechanism C2 being transmitted to the intermediate shaft 35, when the first speed changing section 54 effects no transmission, the first counter shaft 51 will be rotated by the driving force transmitted via the high speed transmission gear 56. Therefore, under this state, if the second speed changing section 55 is set to the power-transmission engaging state, low speed driving power speed-reduced via the first low speed transmission gear 58 and the second low speed transmission gear 59 will be transmitted to the rear wheel drive shaft 53 and low speed driving powers will be transmitted to the rear wheels 2 and the front wheels 1.

Further, by setting the other one of the two clutch sections of the second clutch mechanism to the power-transmission engaging state, under a state of the driving power being transmitted from the third transmission gear 38 to the first counter shaft 51, if the first speed changing section 54 is operated to transmit the driving power of the first counter shaft 51 to the rear wheel drive shaft 53, reverse driving powers will be transmitted to the rear wheels 2 and the front wheels 1. Incidentally, the operational position for transmitting the driving power from the first counter shaft 51 to the rear wheel drive shaft 53 in the second clutch mechanism C2 is the same position as the position for transmitting the driving power from the high speed transmission gear 56 to the rear wheel drive shaft 53.

A front wheel speed changer device 65 is disposed between the front wheel drive shaft 66 and the front wheel transmission shaft 64 and includes a constant speed transmission gear 65a, an acceleration transmission gear 65b and a switching clutch mechanism 65c. This switching clutch mechanism 65c is configured as a hydraulic multiple plate type which is operated under a state of selectively transmitting the driving power with feeding/discharging of the work oil and a state of blocking, i.e. not transmitting the driving power.

With the above-described arrangement, when the traveling vehicle body A is to travel straight, the constant speed transmission gear 65a is set to the transmission engaging state under control by the switching clutch mechanism 65c, the peripheral speed of the front wheels 1 and the peripheral speed of the rear wheels 2 are set equal to each other. Also, in case the steering wheel 8 has been operated by an amount exceeding a set amount, the acceleration transmission gear 65b is set to the transmission engaging state under the control of the switching clutch mechanism 65c, the peripheral speed of the front wheels 1 is set higher than the peripheral speed of the rear wheels 2, thereby to reduce the turning radius. Further, in the case of traveling under a state of no driving power being transmitted to the front wheels 1 (two-wheel state), by the switching clutch mechanism 65c, it is possible to set to the state of disengaging driving power transmission.

[Implement Speed Changer Device]

At a position rearwardly of the intermediate shaft 35, there is provided an arrangement for transmitting the driving power from the main drive shaft 31 via a pump drive gear 71 to an implement pump 72.

The implement speed changer device 70 includes a hydraulic multiple plate type implement clutch 73 for engaging/disengaging transmission of the driving power from the main drive shaft 31, an implement speed changing section 74, an implement speed changer shaft 75 to which driving power from the implement speed changing section 74 is transmitted, and an output gear 76 for transmitting the driving power from the implement speed changer shaft 75 to the PTO shaft 17.

The implement speed changing section 74 includes two implement speed changer clutches 74a disposed coaxially with the implement speed changer shaft 75, an implement counter shaft 74b rotatably fitted on the rear wheel drive shaft 53, a first implement gear 74c for transmitting driving power from the implement clutch 73 to the implement counter shaft 74b, and three second implement gears 74d configured to transmit the driving power from the implement counter shaft 74b to a corresponding one of the two implement speed changer clutches 74a. Incidentally, each of the two implement speed changer clutches 74a is configured as a manually operable meshing type clutch.

With this implement speed changing section 74 in operation, in a situation of the implement clutch 73 being set to the transmission engaging state, by selective operation of the two implement speed changer clutches 74a, it is possible to set the driving power transmitted from the main drive shaft 31 to one of a reduced speed transmission state, an intermediate speed transmission state, a high speed transmission state and a reverse transmission state, to transmit the power to the implement speed changer shaft 75. Further, the implement pump 72 is configured to feed lubricant oil reserved in the transmission case 12 as the work oil.

Incidentally, the work oil of the implement pump 72 is fed via a control valve (not shown) to the first clutch mechanism C1, the second clutch mechanism C2, the switching clutch mechanism 65c and to the implement clutch 73.

[Function/Effect of Embodiment]

The driving power of the engine 4 is speed-changed steplessly by the stepless speed changer device 20 and then the resultant speed-changed driving power can be largely reduced in speed by the two planetary gear speed changer devices, namely, the first planetary gear speed changer device Q1, the second planetary gear speed changer device Q2. Therefore, the stepless speed changer device 20 to be employed can be one having a small capacity. Further, the driving powers speed-changed respectively by the first planetary gear speed changer device Q1 and the second planetary gear speed changer device Q2 can be taken off via the first clutch mechanism C1 and the second clutch mechanism C2 corresponding respectively thereto and then transmitted to the traveling speed changer device 50.

In particular, since the first planetary gear speed changer device Q1 and the second planetary gear speed changer device Q2 are disposed in the juxtaposition relationship with each other, compared with an arrangement of disposing a plurality of planetary gear speed changer devices in series, the space accommodating the planetary gear speed changer devices can be formed compact in the front/rear direction. Consequently, there has been realized a work vehicle that allows suppression of disadvantageous enlargement of the speed changing arrangement and also allows simplification of this speed changing arrangement, without compromising the advantage of using a hydrostatic stepless speed changer device and a planetary gear speed changer device.

Other Embodiments

The present invention may alternatively be configured as follows, in addition to the foregoing embodiment (in the following, elements having same or substantially same functions as the foregoing embodiment will be denoted with same or like numerals, marks provided in the foregoing embodiment).

Figure 5:
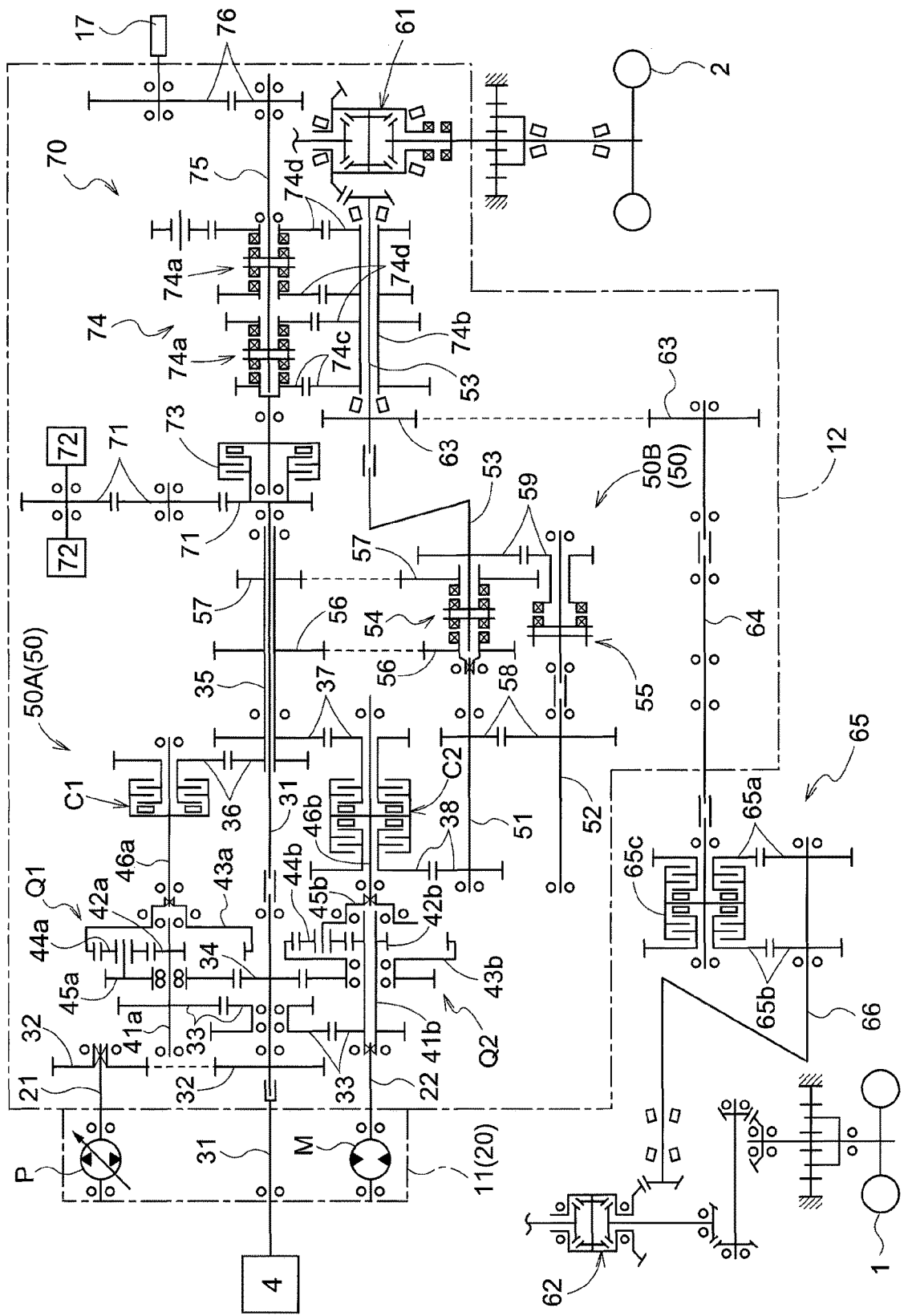
FIG. 5 is a view schematically showing a transmission arrangement relating to Further Embodiment (a)

(a) As shown in FIG. 5, a transmission case 12 of a tractor (an example of "work vehicle") is configured with omission of the main clutch housing 10 and the main clutch mechanism 18 described in the foregoing embodiment. In this Further Embodiment (a), its transmission case 12 has a basically same configuration as that of the foregoing embodiment, except the omission of the main clutch housing 10 and the main clutch mechanism 18.

In the configuration of this Further Embodiment (a), when the engine 4 is to be started or the traveling vehicle body A is to be stopped, control will be set for stopping flow of work oil by setting the angle of the movable swash plate 24b of the stepless speed changer device 20 to a posture orthogonal to the pump axis or setting the first clutch mechanism C1 and the second clutch mechanism C2 to the power transmission disengaging states, simultaneously.

In this way, in the Further Embodiment (a), as components for constituting the main clutch housing 10 and the main clutch mechanism 18 described in the foregoing embodiment are no longer needed, the reduction in the number of components of the work vehicle is made possible and the size of the vehicle body in the front/rear direction is reduced to allow compactization of the work vehicle as well as weight reduction of the vehicle body.

Figure 6:
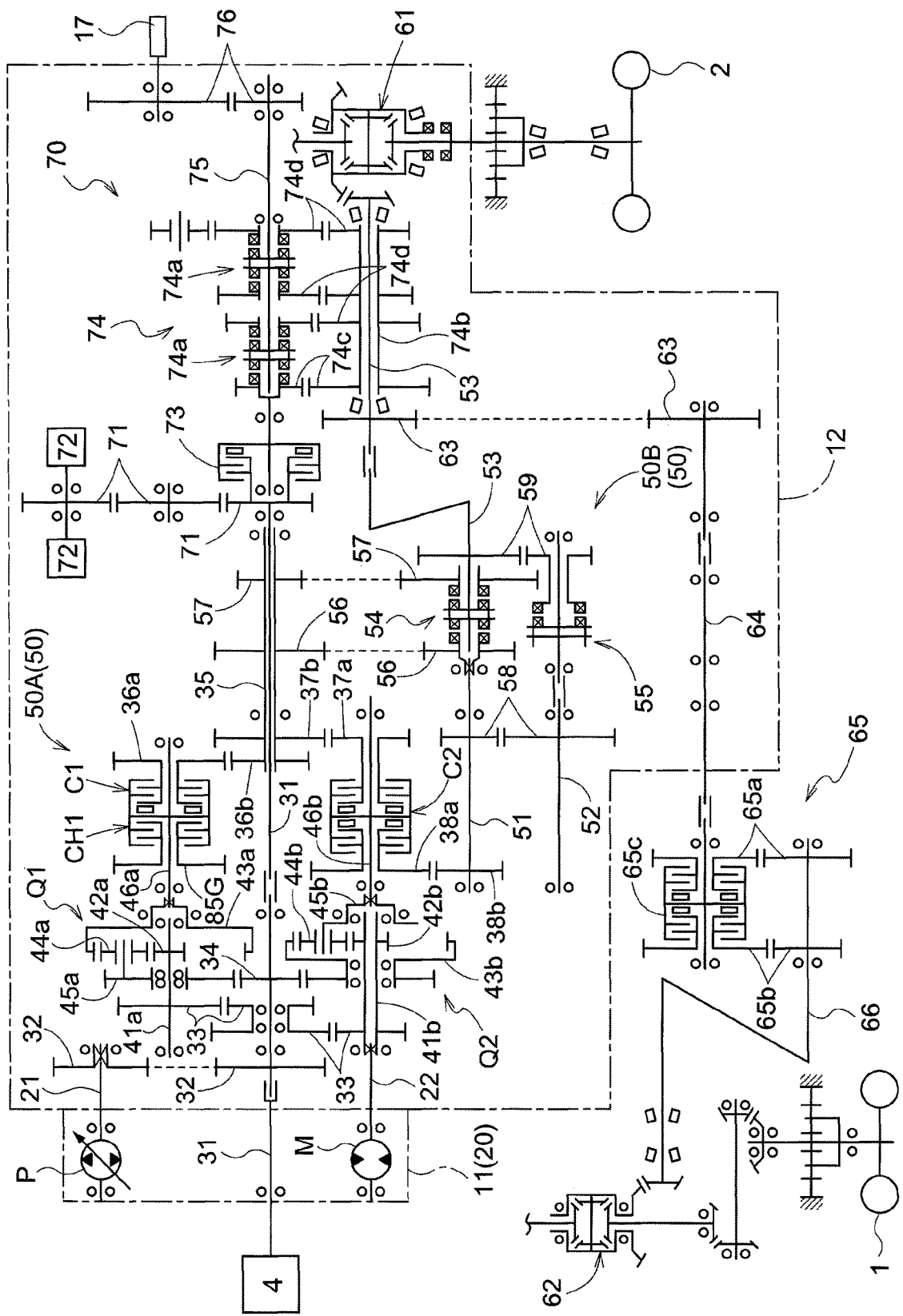
FIG. 6 is a view schematically showing a transmission arrangement relating to Further Embodiment (b)

(b) As shown in FIG. 6, like Further Embodiment (a) described above, a transmission case 12 of a tractor (an example of "work vehicle") is configured with omission of the main clutch housing 10 and the main clutch mechanism 18 described in the foregoing embodiment. More particularly, there is provided an arrangement for suppressing occurrence of inconvenience of the traveling vehicle body A being moved at a low speed due to drag torques applied respectively from the first output shaft 46a (an example of "first shaft") and the second output shaft 46b (an example of "second shaft") in the case of both the wet type first clutch mechanism C1 and the wet type second clutch mechanism C2 being under the power transmission disengaging states.

Figure 7:
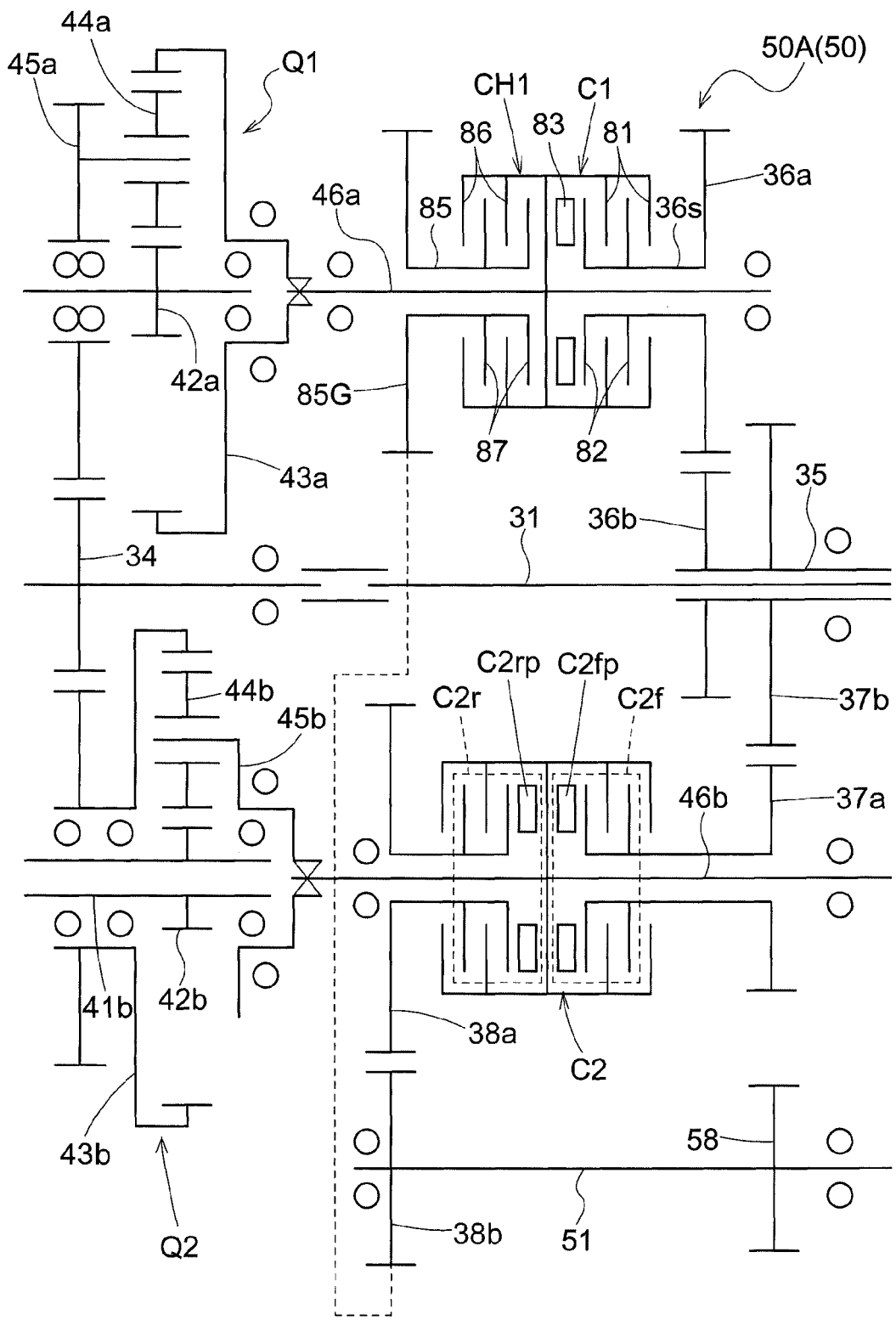
FIG. 7 is a view schematically showing an intermediate rotational member and a coupling portion relating to Further Embodiment (b)

As shown in FIG. 6 and FIG. 7, the first clutch mechanism C1, under its transmission engaging state, transmits the driving power of the first output shaft 46a (an example of "first shaft2") as forward traveling driving power via the first forward traveling output gear 36a to the first forward traveling input gear 36b of the intermediate shaft 35.

Further, the second clutch mechanism C2 includes a forward traveling clutch section C2f and a reverse traveling clutch section C2r. The forward traveling clutch section C2f, under its power-transmission engaging state, transmits the driving power of the second output shaft 46b (an example of "second shaft") as forward traveling driving power via a second forward traveling output gear 37a to a second forward traveling input gear 37b of the intermediate shaft 35. The reverse traveling clutch section C2r, under its power-transmission engaging state, transmits the driving power of the second output shaft 46b (an example of "second shaft") as reverse traveling driving power via a second reverse traveling output gear 38a (an example of "reverse traveling output gear") to a second reverse traveling input gear 38b (an outputting section, an example of "reverse traveling transmission gear") of the first counter shaft 51.

Incidentally, in this transmission case 12, there is set an arrangement such that the driving speed transmitted to the front wheels 1 and the rear wheels 2 when the first clutch mechanism C1 is set to the transmission engaging state may be higher than the driving speed transmitted to the front wheels 1 and the rear wheel 2 when the forward traveling clutch section C2f of the second clutch mechanism C2 is set to the transmission engaging state.

Figure 8:
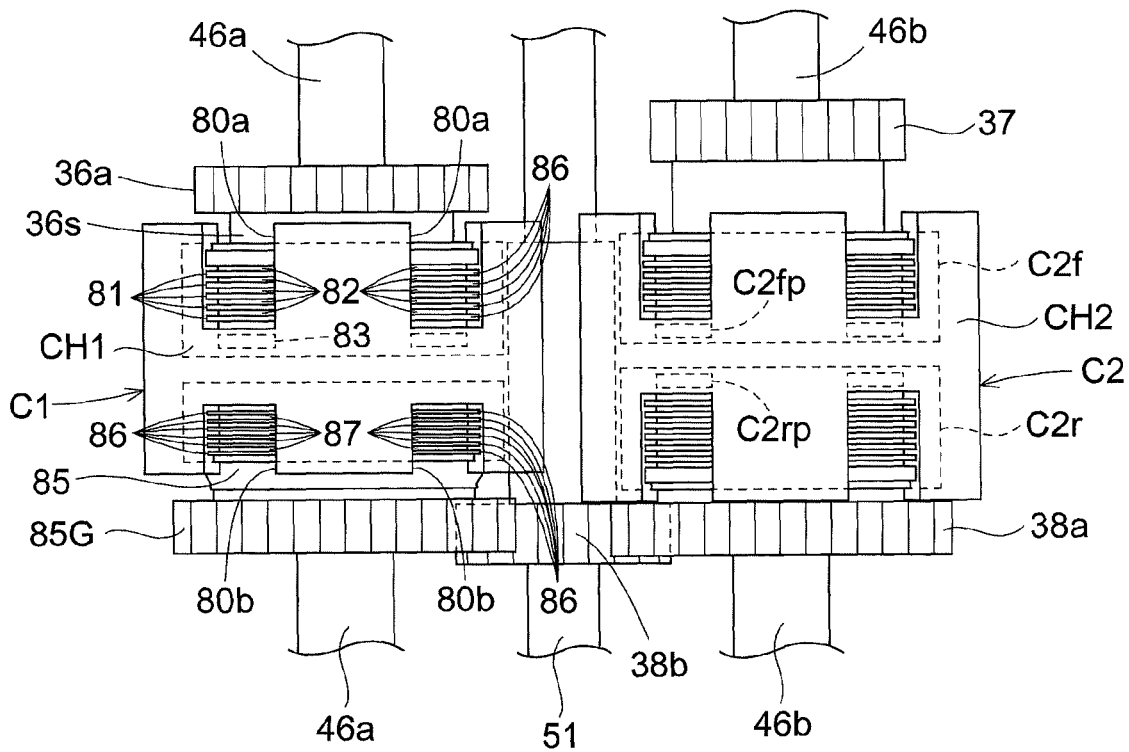
FIG. 8 is a view showing a first clutch mechanism, a second clutch mechanism and a gear portion relating to Further Embodiment (b)
Figure 9:
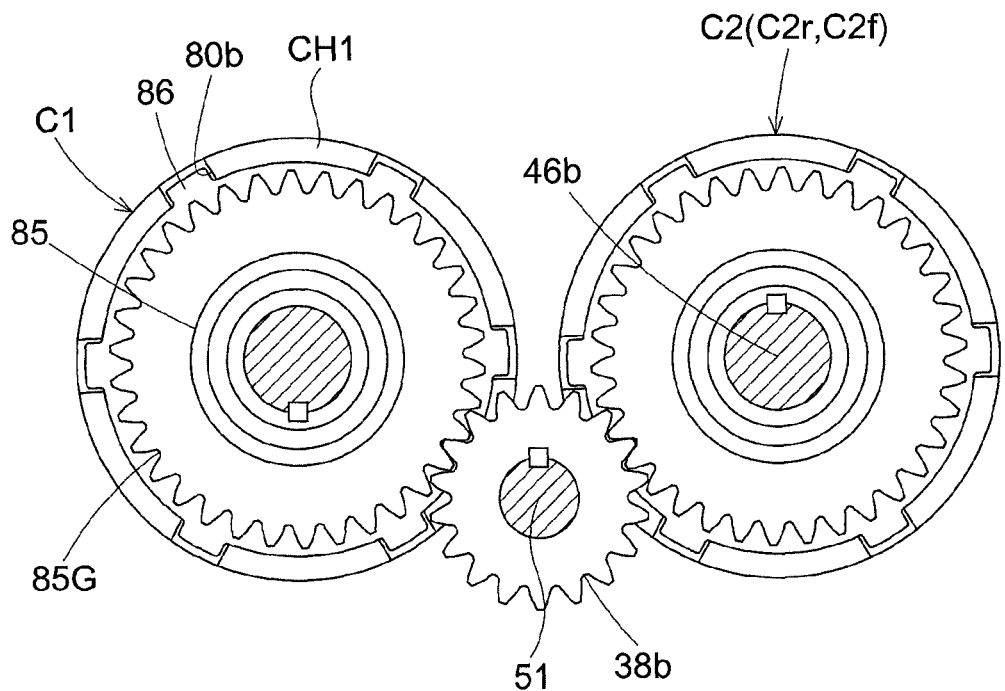
FIG. 9 is a view showing the gear portion and a second reverse traveling input gear relating to Further Embodiment (b).

In this Further Embodiment (b), as shown in FIGS. 7 through 9, there is provided an intermediate rotational member 85 to which a drag torque is applied in association with rotation of the first output shaft 46a, and an arrangement is provided such that by transmitting rotational power of this intermediate rotational member 85 to the second reverse traveling output gear 38a (an example of "reverse traveling transmission gear"), the phenomenon of traveling driving power being transmitted to the left and right front wheels 1 and the left and right rear wheels 2 as the traveling mechanism may be suppressed.

The first clutch mechanism C1 includes, inside a first clutch housing CH1, a first sleeve 36s which is rotated with the first forward traveling output gear 36a and includes also a plurality of driving side friction plates 81 engageable with a plurality of first slits 80a defined in the outer circumference of the first clutch housing CH1, a plurality of driven side friction plates 82 engaged on the first sleeve 36s for transmitting torque thereto, and a first piston 83 operable to place the driving side friction plates 81 and the driven side friction plates 82 under pressed contact each other by feeding the pressure oil.

In this first clutch mechanism C1, the first clutch housing CH1 is rotatable together with the first output shaft 46a, and the driving side friction plates 81 and the driven side friction plates 82 are disposed in alternation. And, oil passages for feeding/discharging work oil to/from the first piston 83 are formed inside the first output shaft 46a.

And, when the work oil is fed to the first piston 83 by feeding of the work oil, there is realized a power-transmission engaging state in which the plurality of driving side friction plates 81 and the plurality of driven side friction plates 82 are placed under pressed contact with each other, whereby the driving power of the first output shaft 46a will be transmitted to the first forward traveling output gear 36a. With discharging of the work oil, the pressure from the piston is released, whereby the plurality of driving side friction plates 81 and the plurality of driven side friction plates 82 will be detached from each other, thus realizing a transmission disengaging state of not transmitting the driving power.

In the second clutch mechanism C2, inside a second clutch housing CH2, a forward traveling clutch section C2*f* and a reverse traveling clutch section C2*r* are accommodated. And, the forward traveling clutch section C2*f* and the reverse traveling clutch section C2*r* have basically same arrangements as those of the first clutch mechanism C1. The forward traveling clutch section C2*f* includes a forward traveling piston C2*fp* for pressing the friction plates for contact and the reverse traveling clutch section C2*r* includes a reverse traveling piston C2*rp* for pressing the friction plates for contact.

With the above-described arrangement in operation, with feeding of the work oil to the forward traveling piston C2*fp*, there is realized a power-transmission engaging state for transmitting the driving power of the second output shaft 46b to the second forward traveling output gear 37a. With discharging of the work oil, there is realized the power-transmission disengaging state of not transmitting the driving power thereto. Further, with feeding of the work oil to the reverse traveling piston C2*rp*, there is realized a power-transmission engaging state for transmitting the driving power of the second output shaft 46b to the second reverse traveling output gear 38a. With discharging of the work oil, there is realized a power-transmission disengaging state of not transmitting the driving power thereto.

The first clutch mechanism C1 and the second clutch mechanism C2 respectively is configured to allow introduction thereto of the lubricant oil reserved in the transmission case 12. Due to this configuration, in the case of the first clutch mechanism C1 being under the power-transmission disengaging state, even when the driving side friction plates 81 and the driven side friction plates 82 are spaced apart from each other in their positional relationship, due to the viscosity of the lubricant oil, these discs will be rotated together, so that a drag torque will be transmitted via the first forward traveling output gear 36a to the front wheels 1 and the rear wheels 2.

Further, in case the forward traveling clutch section C2*f* and the reverse traveling clutch section C2*r* of the second clutch mechanism C2 are under the transmission disengaging state, like the first clutch mechanism C1, the discs therein will be rotated together, so that a drag torque will be transmitted to the front wheels 1 and the rear wheels 2.

In this Further Embodiment (b), the intermediate rotational member 85 is provided as a tubular member fitted on the first output shaft 46a to be freely rotatable relative thereto, and for this intermediate rotational member 85, a gear portion 85G as a "coupling portion" is formed integrally on the outer circumference side of this intermediate rotational member 85, with this gear portion 85G being meshed with the second reverse traveling input gear 38b.

As shown in FIG. 8, the intermediate rotational member 85 is disposed, inside the first clutch housing CH1, on the side opposite the first sleeve 36s in the direction along the axis of the first output shaft 46a. In the first clutch housing CH1, on the side opposite to first slits 80a in the direction along the axis of the first output shaft 48a, there are formed a plurality of second slits 80b.

Further, there are provided a plurality of plate-like friction plates 86 (an example of "friction members") engageable with the second slits 80b of the first clutch housing CH1 and a plurality of plate-like friction rings 87 (an example of "friction plates") fitted on the outer circumference of the intermediate rotational member 85 for transmitting torque thereto. Although the plurality of friction plates 86 and the plurality of friction rings 87 are similar in the configuration to those of the first clutch mechanism C1, the former differs from the latter in that there is provided no piston for causing the plurality of friction plates 86 and the plurality of friction rings 87 to come into contact with each other.

Since the first clutch housing CH1 is rotated in unison with the first output shaft 46a as described above, even when the first clutch mechanism C1 is set under the transmission disengaging state, the first clutch housing CH1 will still be rotated and in association with this rotation, the friction plates 86 will be rotated, so that the friction rings 87 adjacent thereto will be rotated due to the influence of resultant drag torque. As a result of this, rotational power will be transmitted to the intermediate rotational member 85 and this rotational power will be transmitted via the second reverse traveling input gear 38b to the first counter shaft 51. In this way, a drag torque transmitted from the intermediate rotational member 85 to the first counter shaft 51 will be applied in the direction of causing the traveling vehicle body A to travel in reverse.

[Function and Effect of Further Embodiment (b)]

In the case of the configuration of the transmission case 12 shown in FIGS. 6 through 9, in case the first clutch mechanism C1 is under the transmission disengaging state and the forward traveling clutch section C2*f* and the reverse traveling clutch section C2*r* of the second clutch mechanism C2 are under the transmission disengaging states, from the first clutch mechanism C1 and the forward traveling clutch section C2*f*, drag torques will be applied in the forward traveling direction to the front wheels 1 and the rear wheels 2 and, from the reverse traveling clutch section C2r, drag torques will be applied in the reverse traveling direction to the front wheels 1 and the rear wheels 2.

In the case of the above-described configuration in which drag torques are applied in the forward traveling direction from two clutches and a drag torque is applied in the reverse traveling direction from one clutch, the drag torques in the forward traveling direction are greater than the drag torque in the reverse traveling direction, thus tending to invite the inconvenience of low-speed forward traveling of the vehicle body.

On the other hand, as shown in FIG. 8 and FIG. 9, since the gear portion 85G of the intermediate rotational member 85 is meshed with the second reverse traveling input gear 38b, it becomes possible to cause the rotational power of the intermediate rotational member 85 to be effective in the reverse traveling direction. With this, by increasing the drag torque in the reverse traveling direction so as to offset the drag torque in the forward traveling direction with the drag torque in the reverse traveling direction, the inconvenience of low speed movement of the traveling vehicle body A is resolved. In particular, since the above-described configuration does not include any actuator for suppressing the inconvenience of low speed movement of the traveling vehicle body A, no complexity of the configuration or increase in the number of components thereof will be invited, either.

(c) As the coupling member for transmitting the rotational power of the intermediate rotational member 85 to the second reverse traveling input gear 38b (outputting section) of the second clutch mechanism C2, a timing belt or a plurality of gears will be used.

As a variation of this Further Embodiment (c), the second reverse traveling output gear 38a of the second clutch mechanism C2 will be used as an "outputting section" and in order to transmit the rotational power of the intermediate rotational member 85 to this second reverse traveling output gear 38a, the coupling portion may be constituted of a gear portion 85G formed in the outer circumference of the intermediate rotational member 85 in combination with an idle gear meshing with this gear portion 85G. In the case of this arrangement, as the idle gear meshes with the second reverse traveling output gear 38a, a rotational power in the opposite direction to the rotational direction of the intermediate rotational member 85 will be transmitted to the second reverse traveling output gear 38a.

(d) As an arrangement for causing the intermediate rotational member 85 to apply a drag torque in association with rotation of the first output shaft 46a (first shaft), an arrangement of simply fitting the intermediate rotational member 85 loosely on the first output shaft 46a or a coupling arrangement for generating a drag torque to the first output shaft 46a with utilization of a fluid may be employed. Further alternatively, an arrangement of supporting the intermediate rotational member 85 and the coupling portion (e.g. the gear portion 85G, etc.) to different shaft members may be employed.

The Further Embodiment (d) involves a technical concept that the intermediate rotational member 85 and the coupling portion (e.g. the gear portion 85G, etc.) need not necessarily be disposed on a common axis. Therefore, it is conceivable to support the gear portion 85G as the coupling portion to a shaft body located at a different location from that of the first output shaft 46a and to transmit the drag torque from the intermediate rotational member 85 to the gear portion 85G by a timing belt, an endless chain, a gear (or gears), etc.

As an arrangement similar to the above, it is also conceivable to provide a shaft body rotated by the driving power of the first output shaft 46a at a location different from the location of the first output shaft 46a and to fit the intermediate rotational member 85 on this shaft body for transmitting the drag torque associated with rotation of the shaft body to the intermediate rotational member 85 and further transmitting it from this intermediate rotational member 85 to the gear portion 85G.

(e) The stepless speed changer housing 11 and the main clutch housing 10 of the stepless speed changer device 20 may be formed integral with each other. Or, the stepless speed changer device 20 and the transmission case 12 may be formed integral with each other. With these arrangements, in comparison with an arrangement wherein these members are manufactured separately and then connected to each other with using bolts or the like, improvement in the strength will be made possible and reduction in the weight of the entire transmission system too will be made possible.

(f) The traveling speed changer device 50 maybe constituted by using three or more planetary gear speed changer mechanisms. By using three or more planetary gear speed changer devices as above, speed change operations in multiple stages can be made easily.

(g) The input shaft 21 and the output shaft 22 of the stepless speed changer device 20 may be caused to protrude forwardly. With this, it becomes possible to transmit the driving power of the engine 4 directly to the input shaft 21.

INDUSTRIAL APPLICABILITY

The present invention is applicable to a work vehicle configured such that driving power of an engine is speed-changed by a stepless speed changer device and a planetary gear speed changer device.

The present invention is applicable also to a work vehicle configured such that speed changing operations are effected by controlling two wet type clutches.

DESCRIPTION OF SIGNS

1: front wheel (traveling mechanism)
2: rear wheel (traveling mechanism)
4: engine
12: transmission case
20: stepless speed changer device
21: input shaft
22: output shaft
23: port block
31: main drive shaft (drive shaft)
32: driving gear mechanism
33: branching gear mechanism
38a: second reverse traveling output gear (reverse traveling output gear)
38b: second reverse traveling input gear, reverse traveling transmission gear (outputting section)
46a: first output shaft (first shaft)
46b: second output shaft (second shaft)
50: traveling speed changer device (traveling speed changing section)
50B: auxiliary speed changer device
85: intermediate rotational member
85G: gear portion, coupling portion
86: friction plate, friction member
87: friction ring, friction plate
A: traveling vehicle body (vehicle body)
C1: first clutch mechanism (clutch mechanism)

C2: second clutch mechanism (clutch mechanism)
C2f: forward traveling clutch section
C2r: reverse traveling clutch section
CH1: first clutch housing (clutch housing)
Q1: first planetary gear speed changer device (planetary gear speed changer device)
Q2: second planetary gear speed changer device (planetary gear speed changer device)
P: hydraulic pump
M: hydraulic motor

The invention claimed is:

1. A work vehicle comprising:
a hydrostatic stepless speed changer device configured to speed-change driving power of an engine steplessly;
a plurality of planetary gear speed changer devices configured to speed-change the driving power speed-changed by the stepless speed changer device;
a plurality of clutch mechanisms corresponding to the plurality of planetary gear speed changer devices in order to take off the driving powers from these plurality of planetary gear speed changer devices individually;
a traveling speed changing section for speed-changing and transmitting the driving powers transmitted from the plurality of clutch mechanisms to a traveling mechanism having at least one wheel;
the plurality of planetary gear speed changer devices being arranged in juxtaposition relationship with each other;
each of the plurality of planetary gear speed changer devices having a respective output shaft, each of the respective output shafts having a respective axis of rotation, wherein each of the respective axes of rotation are offset from each other in a vehicle width direction; and
the plurality of planetary gear speed changer devices, the plurality of clutch mechanisms, and the traveling speed changing section being accommodated in a transmission case,
wherein:
the engine, the stepless speed changer device and the plurality of planetary gear speed changer devices are disposed in this mentioned order along the front/rear direction of the vehicle body;
the stepless speed changer device includes a variable displacement type hydraulic pump driven by the engine and a hydraulic motor rotated by work oil fed from the hydraulic pump;
an input shaft of the hydraulic pump and an output shaft of the hydraulic motor are formed to protrude toward the disposing direction of the planetary gear speed changer devices;
a drive shaft for transmitting the driving power of the engine is disposed to penetrate the stepless speed changer device along the front/rear direction; and
including a drive gear mechanism configured to transmit a driving power from a portion of the drive shaft which portion penetrates the stepless speed changer device to the input shaft and a branching gear mechanism configured to transmit the driving power from the output shaft to the plurality of planetary gear speed changer devices.

2. The work vehicle of claim 1, wherein:
the plurality of planetary gear speed changer devices comprise a first planetary gear speed changer device on a high speed side configured to provide a small speed changing ratio and a second planetary gear speed changer device on a low speed side configured to provide a large speed changing ratio;
the plurality of clutch mechanisms comprise a first clutch mechanism configured to engage/disengage transmission of the driving power from the first planetary gear speed changer device and a second clutch mechanism configured to engage/disengage transmission of the driving power from the second planetary gear speed changer device; and
the traveling speed changing section includes an auxiliary speed changer device configured to provide a speed changing of the driving powers from the first clutch mechanism and the second clutch mechanism.

3. The work vehicle of claim 1, wherein the juxtaposition relationship is along a left/right direction inside the transmission case.

4. The work vehicle of claim 1, wherein the plurality of speed changer devices do not overlap with each other in the vehicle width direction.

5. A work vehicle comprising:
a hydrostatic stepless speed changer device configured to speed-change driving power of an engine steplessly;
a plurality of planetary gear speed changer devices configured to speed-change the driving power speed-changed by the stepless speed changer device;
a plurality of clutch mechanisms corresponding to the plurality of planetary gear speed changer devices in order to take off the driving powers from these plurality of planetary gear speed changer devices individually;
a traveling speed changing section for speed-changing and transmitting the driving powers transmitted from the plurality of clutch mechanisms to a traveling mechanism having at least one wheel;
the plurality of planetary gear speed changer devices being arranged in juxtaposition relationship with each other;
each of the plurality of planetary gear speed changer devices having a respective output shaft, each of the respective output shafts having a respective axis of rotation, wherein each of the respective axes of rotation are offset from each other in a vehicle width direction; and
the plurality of planetary gear speed changer devices, the plurality of clutch mechanisms, and the traveling speed changing section being accommodated in a transmission case, wherein:
the stepless speed changer device includes a variable displacement type hydraulic pump driven by the engine, a hydraulic motor rotated by work oil fed from the hydraulic pump, and a port block defining a hydraulic circuit formed between the hydraulic pump and the hydraulic motor; and
the hydraulic pump and the hydraulic motor are disposed on the side of a rear face of the port block.

6. The work vehicle of claim 5, wherein the juxtaposition relationship is along a left/right direction inside the transmission case.

7. The work vehicle of claim 5, wherein the plurality of speed changer devices do not overlap with each other in the vehicle width direction.

8. A work vehicle comprising:
a first clutch mechanism of a wet type configured to engage/disengage transmission of a traveling driving power transmitted from a first shaft to a traveling mechanism having at least one wheel;

a second clutch mechanism of a wet type configured to engage/disengage transmission of a traveling driving power transmitted from a second shaft to the traveling mechanism;

an intermediate rotational member rotatable relative to the first shaft due to a drag torque associated with rotation of the first shaft, including while the first clutch mechanism is under a transmission disengaging state; and a coupling portion configured to transmit a rotational power of the intermediate rotational member to an output portion of the second clutch mechanism;

a first planetary gear speed changer device for speed-changing traveling driving power and transmitting the resultant power to the first shaft;

a second planetary gear speed changer device for speed-changing traveling driving power and transmitting the resultant power to the second shaft;

the first clutch mechanism being configured to transmit, under its transmission engaging state, the driving power of the first shaft to the traveling mechanism as a forward traveling driving power;

the second clutch mechanism including a forward traveling clutch section configured to transmit, under its transmission engaging state, the driving power of the second shaft to the traveling mechanism as a forward traveling driving power and a reverse traveling clutch section configured to transmit, under its transmission engaging state, the driving power of the second shaft to the traveling mechanism as a reverse traveling driving power to the traveling mechanism; and the second clutch mechanism further including a reverse traveling output gear configured to output the reverse traveling driving power from the reverse traveling clutch section, so that with meshing of the reverse traveling output gear with a reverse traveling transmission gear, the reverse traveling driving power is transmitted to the traveling mechanism.

9. The work vehicle of claim 8, wherein the coupling portion comprises a gear portion which is rotated by a rotational power of the intermediate rotational member, the gear portion being meshed with the reverse traveling transmission gear.

10. The work vehicle of claim 9, wherein the gear portion is formed in an outer circumference of the intermediate rotational member.

11. The work vehicle of claim 8, wherein:

a driving speed transmitted from the first shaft to the traveling mechanism when the first clutch mechanism is under the transmission engaging state is higher than a driving speed transmitted from the second shaft to the traveling mechanism when the forward traveling clutch section of the second clutch is under the transmission engaging state;

the intermediate rotational member is rotatably supported to the first shaft and includes a friction plate rotatable with the intermediate rotational member; and the friction plate is disposed adjacent a friction member which is rotatable with a clutch housing of the first clutch mechanism.

12. The work vehicle of claim 8, further comprising an auxiliary speed changer device configured to speed-change the driving powers from the first clutch mechanism and the second clutch mechanism.

13. The work vehicle of claim 8, wherein:

the work vehicle further comprises:

a hydrostatic stepless speed changer device configured to steplessly speed-change the driving power of the engine and to transmit the resultant power to the first planetary gear speed changer device and the second planetary gear speed changer device as the traveling driving power; and the first planetary gear speed changer device and the second planetary gear speed changer device are accommodated in a transmission case in a juxtaposition relationship with each other.

14. The work vehicle of claim 13, wherein:

the engine and the stepless speed changer device are disposed in this mentioned order in the front/rear direction;

the first planetary gear speed changer device and the second planetary gear speed changer device are disposed in the juxtaposition relationship, rearwardly of the stepless speed changer device;

the stepless speed changer device includes a variable displacement type hydraulic pump driven by the driving power of the engine and a hydraulic motor rotated by work oil fed from the hydraulic pump;

an input shaft of the hydraulic pump and an output shaft of the hydraulic motor formed to protrude rearwards from the stepless speed changer device;

a drive shaft for transmitting the driving power of the engine is disposed to penetrate the stepless speed changer device in the front/rear direction; and there are provided a driving gear mechanism for transmitting a driving power of a portion of the drive shaft which portion penetrates the stepless speed changer device to the input shaft and a branching gear mechanism for transmitting the driving power of the output shaft to the first planetary gear speed changer device and the second planetary gear speed changer device.

15. The work vehicle of claim 13, wherein:

the stepless speed changer device includes a variable displacement type hydraulic pump driven by the engine, a hydraulic motor rotated by work oil fed from the hydraulic pump and a port block defining a hydraulic circuit formed between the hydraulic pump and the hydraulic motor; and the hydraulic pump and the hydraulic motor are disposed on the side of a rear face of the port block.

* * * * *